United States Patent [19]

Eubank

[11] 4,206,906
[45] Jun. 10, 1980

[54] JACK

[76] Inventor: Marcus P. Eubank, P.O. Box 7576, Longview, Tex. 75601

[21] Appl. No.: 949,675

[22] Filed: Oct. 10, 1978

[51] Int. Cl.² .............................................. B66F 7/12
[52] U.S. Cl. .................................. 254/89 H; 254/105
[58] Field of Search ............ 254/89 H, 89 R, 105–111

[56] References Cited

U.S. PATENT DOCUMENTS

| 3,028,143 | 4/1962 | Cheskin | 254/105 |
| 3,275,298 | 9/1966 | Hand | 254/89 H |

FOREIGN PATENT DOCUMENTS 434448   4/1948   Italy .......................................... 254/105

*Primary Examiner*—Robert C. Watson
*Attorney, Agent, or Firm*—Wofford, Fails & Zobal

[57] ABSTRACT

This specification discloses a jack capable of raising an object from ground level height to a predetermined height characterized by a superstructure that includes a base and a strong member above the base and connected thereto, the strong member having the plurality of stations at predetermined heights therealong; a lift bar for lifting the superstructure and the attached object; top fastener for fastening the lifting bar so as to prevent movement upwardly past the predetermined station on the superstructure; connecting means for connecting the superstructure with the object; extensible leg having a plurality of stations therealong and being slidably disposed in an aperture through the base; bottom fastener for fastening the base along the leg at a predetermined station to prevent downward movement past the station; a jacking means for raising the object by forcing the extensible leg and the lift bar apart so that by one or more cycles the object can be raised at a predetermined height by the jack. Also disclosed are preferred structural details including the simple bolt-on type jack and preferred, simple embodiments that are easily operable by one person.

11 Claims, 7 Drawing Figures

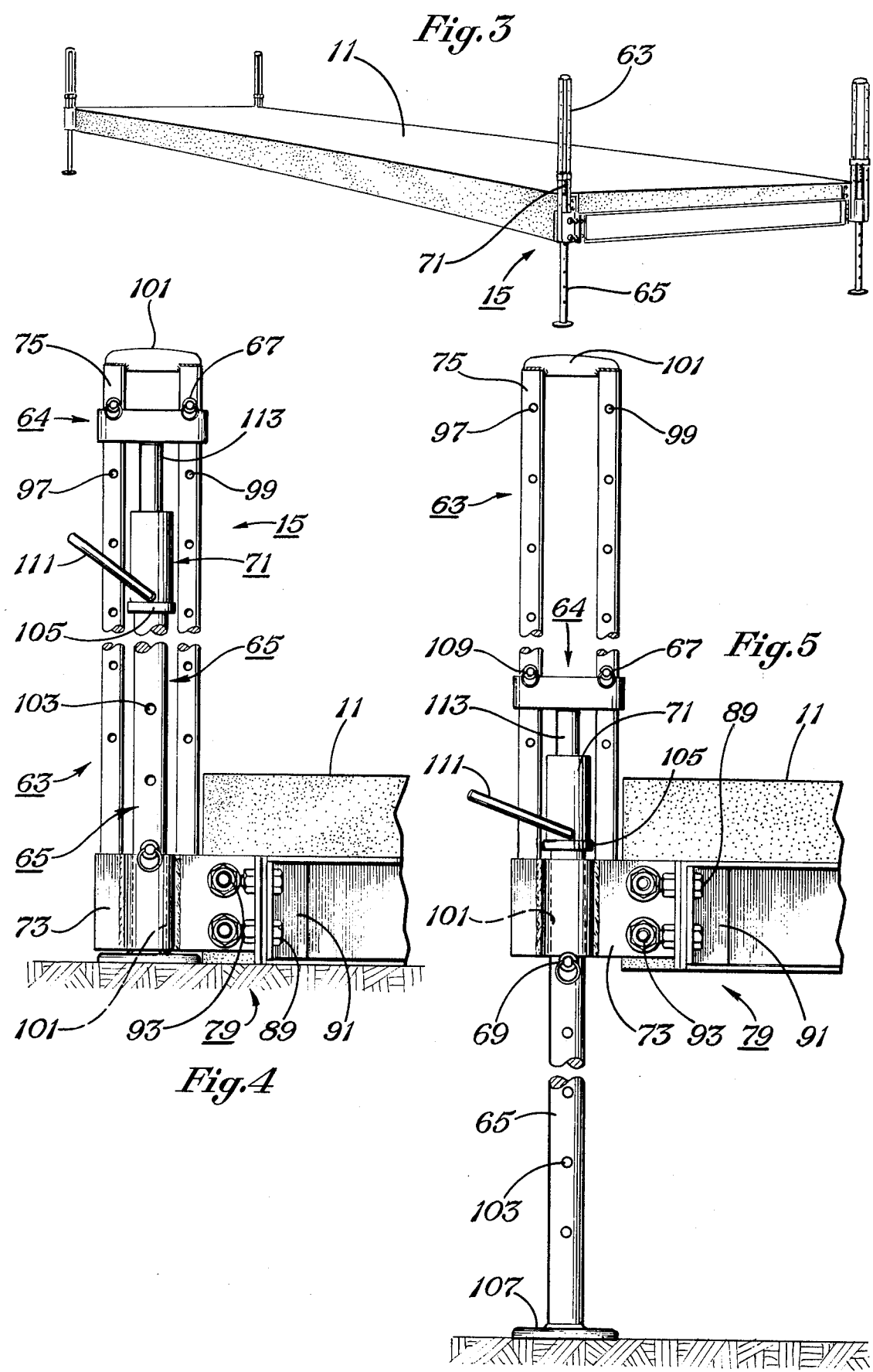

JACK

BACKGROUND OF THE INVENTION

1. Field of the Invention

This invention relates in general to a jack; and, more particularly, to a jack capable of raising an object from ground level height to a predetermined height.

2. Description of the Prior Art

The prior art has seen a wide variety of jacks developed for jacking up objects. In general, these jacks have required that the objects have a predetermined minimum height in order to get the jack under it and were limited in the maximum height to which the object could be jacked; for example, automobile jacks are of this type, as are the various hydraulic jacks.

Where an object was to be raised from ground level, it has been required in the prior art to resort to expensive major equipment having clamshell to high lift capabilities and requiring a large investment. In my co-pending application Ser. No. 932,914, filed Aug. 11, 1978, entitled "TRAILER ASSEMBLY FOR CARRYING OVERWIDTH LOADS", I described a trailer useful in transporting modular floor and frame system, or assembly, mobile homes, modular rooms, and the like. This trailer, while low, requires a jack that can lift the modular unit, such as the modular floor from ground level to a height sufficient to roll the trailer thereunder. When an attempt was made to purchase commercially available jacks to do the job, none were available. Consequently, the jack of this invention was developed.

SUMMARY OF THE INVENTION

Accordingly, it is an object of this invention to provide a jack that can be employed to raise an object from ground level to a desired height.

It is a further object of this invention to provide jacks that enable jacking up a modular floor and frame system to a height sufficient even to emplace a modular room therebeneath; the jacks being inexpensive enough that four jacks may be employed at the respective corners to hold the modular frame at the predetermined height until ready to be let down upon the receiving object therebeneath.

It is a further object of this invention to provide an improved jack for raising an object to a predetermined height, the jack being operable even by a single workman and being connected with the object or disconnected from the object after it has been emplaced on the receiving trailer, walls therebeneath, or the like.

These and other objects will become apparent from the invention, particularly when taken in junction with the appended drawings.

In accordance with this invention, there is provided a jack that comprises:

a. a superstructure comprising
  i. a base adapted to sit at ground level and having a passageway for downward passage of a leg means;
  ii. a structurally strong member having a plurality of stations at a plurality of respective predetermined heights therealong for preventing movement upwardly along the member of a lifting means; the structurally strong member being connected to the base;
b. a lifting means for lifting the superstructure and any object attached thereto; the lifting means comprising a cross-piece that is movable longitudinally of the male member;
c. top fastening means for fastening the lifting means so as to prevent upward movement past a predetermined station on the superstructure;
d. connecting means for connecting the superstructure with the object; said connecting means being connected with said superstructure and having means for removably connecting with the object;
e. extensible leg means for extending downwardly from the superstructure; leg means being slidably disposed in the passageway penetrating through the base; the leg means having plurality of stations at a plurality of respective heights therealong; the legs means having a force pad means for receiving a jacking force at the top;
f. bottom fastening means for fastening the base at a predetermined station along the leg to prevent movement of the base downwardly along the leg means past the predetermined station; the top and bottom fastening means being alternately operable to a plurality of different stations for jacking the object to the predetermined height;
g. jacking means for effecting raising of the object, the jacking means being adapted for positioning between the force pad means on the leg means and the lifting means for applying a jacking force to force the two apart longitudinally of the superstructure; whereby the object can be raised by extension of the legs means through at least one cycle of fastening the lifting means and jacking downwardly on the leg means against the lifting means and fastening the superstructure along the leg means.

Also disclosed are embodiments in which a plurality of cycles can be employed by the additional steps of relaxing the pressure on the lifting means and repositioning it to a new location following fastening along the leg means; again extending the leg means by jacking against the lifting means and refastening the base at a station along the leg means followed by repositioning of the lift means and so on.

BRIEF DESCRIPTION OF THE DRAWINGS

FIG. 3 is a perspective view of the jacks being employed to raise the floor and frame assembly for being emplaced on the trailer.

FIG. 4 is a partial elevational view showing one corner of the modular floor and frame assembly showing the jack attached at ground level.

FIG. 5 is an elevational view of the jack of FIG. 4 with the leg extended, raising the modular floor and frame assembly.

DESCRIPTION OF THE PREFERRED EMBODIMENTS

Figure 1:
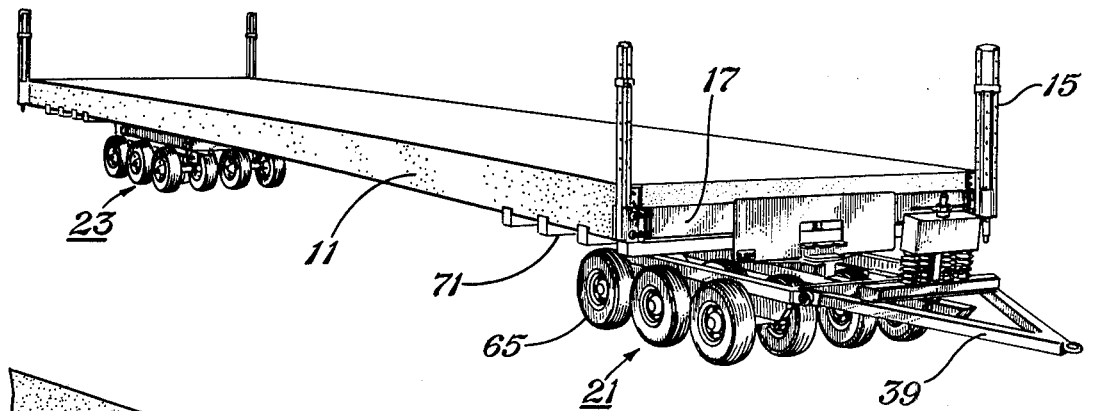
FIG. 1 is a perspective view of a trailer assembly, modular floor and frame, and the jacks installed at each corner of the floor and frame assembly.
Figure 2:
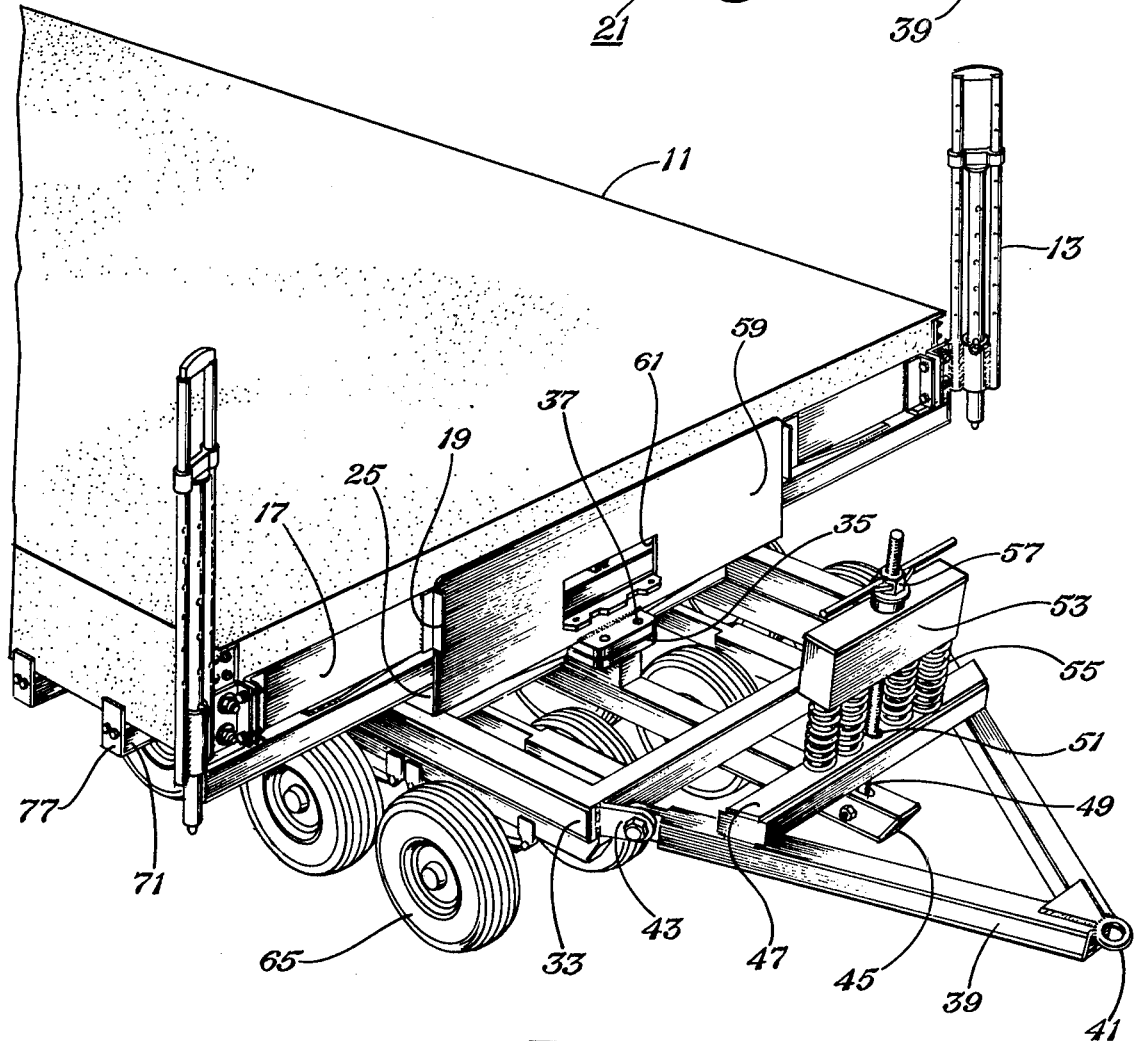
FIG. 2 is an enlarged perspective view of the front of the trailer and the frame, showing the details of the attachment of the jack of this invention.

In FIGS. 1 and 2, the trailer assembly is shown carrying a concrete slab 11, actually comprising a floor and frame assembly for a building with longitudinal beams formed on the side edges and cross beams longitudinally therealong. Jacks 15 are mounted on each corner for raising and lowering the slab 11. A protector plate 17 is bolted to the front and rear of slab 11. A pair of flanges 19 are spaced apart on plate 17 and extend outwardly.

The undercarriage or trailer assembly for carrying the slab 11 includes a front unit 21 and a rear unit 23. As discussed in the above reference co-pending application Ser. No. 932,914, the descriptive matter in which is incorporated herein by reference, the front unit has a generally rectangular upper frame 25 of rectangular tubular members. It has a circular plate serving as a "fifth wheel" secured by a bolt.

A pair of mating tabs 35 extend forwardly from the upper and lower frames 25, 33 and contain apertures 37 for receiving pins to lock the frames together if desired. Tow bar, or tongue, 39 is hingedly connected to the front end of the lower frame 33. The tongue 39 is vee-shaped having two legs that converge into a ring 41 that serves as a hitch for connection to a tow vehicle. The tow vehicle will have a mating pintle (not shown). Each leg of the tongue 39 is connected to lower frame 33 by hinge 43. The hinges 43 allow the tongue to pivot vertically with respect to the lower frame 33 but not horizontally.

A compression means urges the tongue 39 downwardly so that the hitch 41 will apply weight to the tow vehicle. Weight is applied for various purposes. The compression member includes beam 45 rigidly attached to the lower frame 33 and extending forwardly beneath the tongue 39. Transverse member 47 is secured across the legs of tongue 39 above beam 45. A threaded rod 49 is pivotally connected to the end of the beam 45. It extends vertically through an aperture 51 and transverse member 47, and through a second aperture in a plate or housing 53 carried above the transverse member 47. Four coil springs 55 are carried between the housing 53 and transverse member 47. A nut 57 with handles is threaded to rod 49 and bears against the top of housing 53. Tightening nut 57 lowers housing 53. Depending on where the housing 53 is positioned, in order to lift tongue 39, the springs 55 will have to be compressed.

A vertical plate 59 is secured to upper frame 25. Its width is selected to fit within the spaces between flanges 19 to prevent lateral shifting. The slab 11, with its protective plate 17, bears against plate 59. Plate 59 has a rectangular opening 61 in its lower center.

The rear unit 23 includes suitable frame of rectangular tubular members adapted to the be turned crossways similarly as in the front unit for receiving the load and to be oriented longitudinally for a return trip.

The heart of this invention, however, is the jacks 15.

The beauty of the jacks 15, FIG. 4 is that they can be emplaced at ground level and connected with the slab 11 and extended to lift the slab 11 to the desired height, FIGS. 3 and 5.

Each jack 15, FIG. 4, includes a superstructure 63, a connecting means 79, a lifting means 64, a leg means 65 that is extensible; top fastening means 67; bottom fastening means 69; and jacking means 71.

Figure 6:
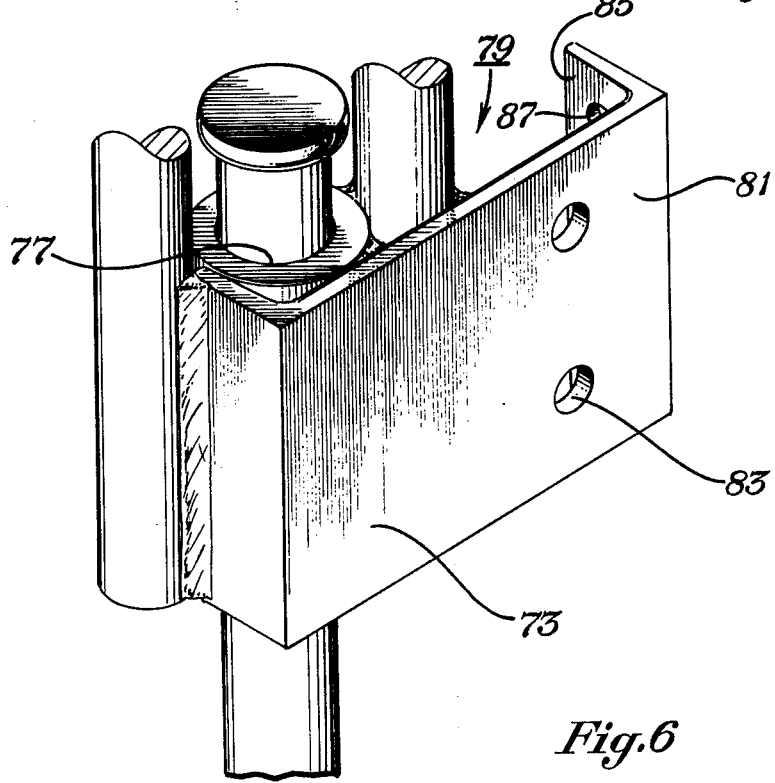
FIG. 6 is a partial isometric view of the base of the jack of FIG. 4.

The superstructure 63, FIGS. 4 and 5, includes a base 73 and a structurally strong member 75 connected to the base and extending upwardly therefrom in operation. The base 73, FIGS. 4–6, is adapted to sit at ground level and has a passageway 77 for slidably receiving the leg means 65. The base 73 is made out of structurally strong material such as steel. In the illustrated embodiment, the base is connected with the object slightly above ground level so it does not require a recess to receive a foot or the like on the leg means. If desired, there may be a recess on the bottom of the base to receive the foot top and still allow attachment at ground level by the connecting means 79.

Figure 7:
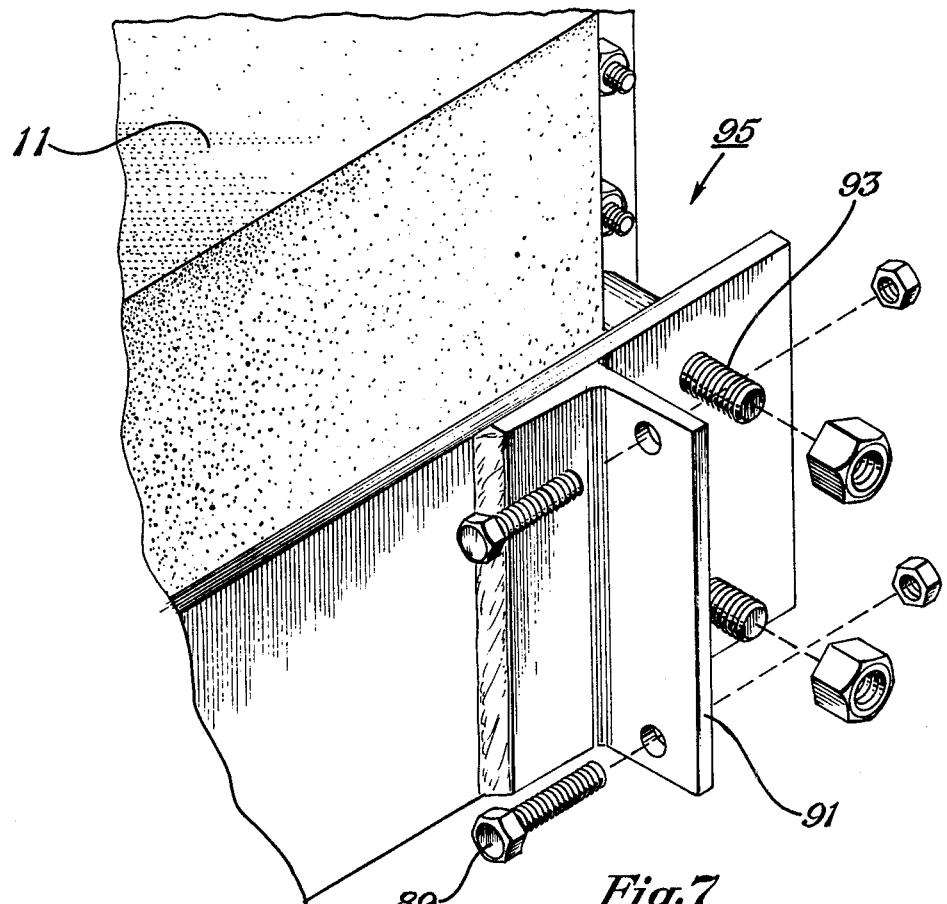
FIG. 7 is a partial isometric view of the corner of a floor and frame assembly adapted for being connected to the base of FIG. 6.

The connecting means 79 comprises a laterally extending, structurally strong tab 81, FIGS. 4 and 6, having apertures 83 for receiving bolt means for connecting the tab 81 with the object 11. As illustrated, the tab 81 also includes a flange 85, FIG. 6, having a pair of apertures 87 for receiving side bolts. As can be seen in FIGS. 5 and 6, the side bolts 89 are connected through the flange and through a mounting bracket 91 on the slab 11. Similarly, bolts 93 are connected with a mounting bracket on the slab 11 and with the tab 81 of the base 73. As can be seen in FIG. 7, the bolts 89 and 93 are connected in the mounting bracket 91 to facilitate attachment of the jack 15. The bolts 93 may be embedded in the end of the slab 11. If desired, the entire corner assembly 95, FIG. 7 may be cast into the precast floor and frame assembly as it is being formed.

The superstructure 63 also includes the strong member 75. As illustrated, the strong member 75 comprises twin upwardly extending members in a pseudo-bail arrangement. The bail member 75 is connected to the base so as to be rigid therewith. Specifically, if desired, the respective legs of the bail members 75 may be screwed into a fitted aperture in the base, may be welded to the base or otherwise rigidly affixed thereto.

In any event, the bail member 75 has a plurality of stations at a plurality of respective predetermined heights for preventing movement upwardly along the bail member of the lifting means 64. As illustrated, the respective stations comprise matched apertures 97, 99, FIGS. 4, 5, defining each station. The bail members 75 comprise high-strength steel tubing in the illustrated embodiment connected with a top member 101. The connection may be by welding or other suitably rigid innerconnection. In the illustrated embodiment in which the superstructure is only about four feet in length, the members may comprise 1½ to 2½ steel tubing and obtain satisfactory results. Other structurally strong materials such as magnesium and aluminum may be employed but it has been found preferable to employ the tougher and more economical metal such as steel. Obviously, more exotic materials such as titanium could be employed but there is no need to do so in this invention.

Thus it can be seen that the apertures 97, 99 serve as their respective stations at which can be affixed the lifting means 64.

The lifting means 64 comprises a cross-piece that is movable longitudinally of the superstructure; but is able to be stopped in its upward movement by respective top fastening means 67. As illustrated, lifting means 64 comprises a cross-piece having apertures at each end that slidably encompass the two members 75 of the superstructure. The lifting means 64 may be formed of any structurally strong material. As illustrated, is preferably formed of the same material as the superstructure 63 of the jack 15. Lifting means 64 serves as a means for lifting a support structure and the attached object 11 and the lifting means 64 serves as a lifting plate for lifting the object when a jacking force is exerted thereagainst and against the extensible leg means 65.

The leg means 65 is slidably disposed in the passageway 101 longitudinally through the base 73. The leg means 65 and the walls of the passageway 101 fit comformably close to minimize any wobble, or lateral movement between the two. The leg means 65 is provided for extending downwardly from the superstructure 63. The leg means 65 has a plurality of stations at a plurality of respective heights in operation along the leg means. Similarly as described hereinbefore with respect to the superstructures 73, the stations comprise apertures 103 along the leg means. Expressed otherwise, the apertures 103 serve as bottom fastening means for preventing downward movement of the base along the leg means and for holding the load at a predetermined attained station.

The leg means 65 has a force pad means 105 for receiving a jacking force without damage to the top of the leg means 65. The leg means 65 also has a foot 107 for spreading the load over a larger bearing surface and minimizing the tendency to dig into the surface or impose high stresses with heavy loads.

The leg means 65 may take any simple form that is extensible and has the desired structural strength. The forms may be square beams, I beams, L-members, U-channels or the like. As illustrated, the leg means 65 comprises a tubular high-strength member. The sizes may range through a variety of sizes in accordance with conventional structural engineering load design. As illustrated in the embodiment in which leg means is about four feet in length, the leg means comprises 2½ high-strength structural steel tubing. Obviously, smaller size tubing could be employed if the load is to be less than 30,000–70,000 pound load for the modular floor and frame system. Conversely, the leg means could comprise stronger structure if heavier loads are to be lifted by the jack 15.

In the foregoing it can be seen that the lifting means 64 and extensible leg means 65 serve as means for raising the object, along with the superstructure, and fastening it at a plurality of respective stations by the respective top and bottom fastening means 67, 69.

The top fastening means 67 comprises pin shafts that are readily inserted through the apertures 97, 99 and protrude beyond the dimensions of the superstructure member 75 for blocking upward movement of the lifting means 64 when emplaced at a given station. As illustrated, the pins 109 are simple solid steel pins designed to easily slip through the apertures 97, 99. If desired and preferably the respective pins, or pin shafts, 109 have ends that are tapered to facilitate insertion through the respective apertures.

Other fastening means that are commensurate with the design of the respective stations could be employed, but the pins shafts have been proven to be economical, easily inserted and removed and almost ideal for this application.

Similarly, the bottom fastening means 69 comprise pin shafts of solid metal, such as steel. Both the top and bottom fastening means are, of course, structurally adequate to maintain the loads to which they will be subjected. Ordinarily, the bottom fastening means 69 comprise larger pin shafts since a single shaft must bear the entire load, whereas the top fastening means comprise two pin shafts. The bottom fastening means also preferably has tapered ends to facilitate insertion and removal through the aperture 103.

Similarly as described with respect to the top fastening means 67, bottom fastening means 69 may comprise any design compatible with the respective stations along the leg means 65. The respective fastening means serve as stops against which can be exerted a force equal to the weight of the object for a respective jack for raising the object, as by upward force against the lifting means 64 by the jacking means 71.

The jacking means 71 is provided for effecting the raising of the object. Jacking means 71 is adapted to be positioned between the force pad means 105 of the leg means 65 and the lifting means 64 for applying a jacking force to force the two apart longitudinally of the superstructure. Since the leg means is pressing against a firm surface, such as the surface of the earth, the net effect is to lift the superstructure and the attached object 11. The jacking means 71 may comprise any of the force generating means, including screws, scissors, hydraulic or pneumatic jacks, manual or powered. As illustrated, the jacking means 71 employs a hydraulic ram to force apart lifting means 64 and the leg means 65 for raising the object 11. Specifically, the jacking means 71 comprises a hydraulic jack that can be operated by way of a handle 111. As the handle is moved upwardly and downwardly at its exterior end, hydraulic force is applied to the extensible rod end 113 of the piston (not shown) interiorly of the jack. Consequently, the superstructure 63 is lifted with respect to the leg means 65. Since the object 11 is attached to the superstructure, it is lifted with respect to the surface against which the foot 107 of the leg means 65 sits.

In operation, the jack 15 is assembled as described hereinbefore. The base is attached to the object 11 by way of connecting means 79 comprising the tab 81 with suitable bolts 93 with nuts screwed thereonto in the conventional fashion. Thereafter, the top fastening means 67 are emplaced at a given station, such as at the top of the superstructure. The jack is then emplaced between the lifting means which is held against the top fastening means and the force pad 105 of the leg means 65. The jacking force is exerted to extend the leg more than the distance between respective stations. Thereafter, a bottom fastening means 69 is inserted through the aperture 103 at an appropriate location on the leg means 65. The jack means is released to allow the base 73 to settle onto the bottom fastening means 69. Thereafter, the lifting means 64 is emplaced at a new station and the top fastening means are emplaced at the new station. Again the jacking operation is repeated to force the leg means downwardly more than the distance between the apertures 97, 99 and the cycle is repeated.

Specifically, the bottom fastening means 69 is again inserted through the apertures 103 and the base and object allowed to rest thereon while the lifting means 64 and the top fastening means 67 are moved downwardly to a new station and the jacking force repeated.

It is apparent that through a series of such jacking maneuvers, operable by a single individual workman, each corner of the effective object 11 can be raised by the jacks 15 to the desired height. The desired height may be to receive a trailer or the like.

On the other hand, the desired height may be sufficient to allow the floor and frame assembly to be emplaced above walls or the like. For example, the jack superstructure may be made in lengths up to eight feet or more and the leg made in lengths up to eight feet or more such that a possible height of 16 feet or more may be attained in raising the modular floor and frame system. One of the advantages of this invention is that the jacks 15 extend beyond the exteriormost dimensions of the floor and frame assembly such that the floor and frame assembly can be emplaced at the desired height, and thereafter, walls, such prefab panels, emplaced beneath the floor. After the walls are finished, the prefab floor can be lowered on top of the walls and affixed, as by welding, bolting and the like. In this way, modular construction can be finished rapidly without requiring expensive cranes or the like to sit in place on the construction site.

From the foregoing, it can be seen that this jack may be employed for raising structural elements such as roofs, walkways, and the like into given position with the advantages delineated hereinbefore. From the foregoing, also, it can be seen that this invention achieves the object delineated hereinbefore.

Although this invention has been described with a certain degree of particularity, it is understood that the present disclosure is made only by way of example and numerous changes in the details of construction and the combination and arrangement of parts may be resorted to without departing from the spirit and scope of the invention, the latter being defined by the appended claims.

What is claimed is:

1. A jack capable of raising an object from ground level height to a predetermined height, comprising;
   a. a superstructure that is adapted to be moved monotonically upwardly with respect to a leg means for raising the object to a predetermined height and that includes:
      i. a base adapted to sit on ground level and at such other heights as described to be connected to said objects; said base having a passageway for downward passage of a leg means therethrough;
      ii. a structurally strong member having a plurality of stations at a plurality of respective predetermined heights for preventing movement of a lifting means upwardly along said member past a respective station when a top fastening means is emplaced at the respective station;
   b. a lifting means for lifting said superstructure and any attached object; said lifting means being movable longitudinally of said member of said superstructure unless encumbered by a top fastening means;
   c. top fastening means for fastening said lifting means at a respective predetermined station so as to prevent movement upwardly past the predetermined station on said super structure;
   d. connecting means for connecting said superstructure with said object; said connecting means being connected to said superstructure and having means for removably connecting with said object and offset from said object so as to provide an unobstructed path that is as wide as said object beneath said object;
   e. extensible leg means for extending downwardly from said superstructure; said leg means being disposed in said passageway in said base; said leg means having a plurality of stations at a plurality of respective heights along said leg means; said leg means having a force pad means for receiving a jacking force;
   f. bottom fastening means for fastening said base so as to prevent movement of said base downwardly along said leg means past a predetermined station at which said bottom fastening means is placed; said top and bottom fastening means being alternately operable to a plurality of different stations for jacking up said object to said predetermined height;
   g. jacking means for effecting raising of said object; said jacking means being adapted to be positioned between said force pad means of said leg means and said lifting means for applying the jacking force to force said lifting means and said force pad means apart longitudinally of said superstructure; said leg means and said superstructure having a combined length at least as great as said predetermined height such that said object can be raised by extension of said leg means through at least one cycle of fixing said lifting means and jacking downwardly on said leg means and fastening said superstructure along said leg means.

2. The jack of claim 1 where said member comprises at least two longitudinally extending members that are connected together across the top for stability and to maintain the same distance apart.

3. The jack of claim 2 wherein said members have matching apertures defining each said station and wherein said top fastening means comprises two pin means for pinning through said apertures at a selected said station; said pin means extending past said members so as to prevent upward movement of said lifting means past said station.

4. The jack of claim 3 wherein said lifting means has two passageways, each passageway encompassing a respective said member of said superstructure.

5. The jack of claim 1 wherein said lifting means slidably encompasses said member of said superstructure.

6. The jack of claim 1 wherein said connecting means includes a laterally extending structural tab with apertures for receiving bolt means and bolt means connecting said tab with said object.

7. A jack capable of raising an object from ground level height to a predetermined height, comprising;
   a. a superstructure that includes:
      i. a base adapted to sit on ground level and at such other heights as desired to be connected to said object; said base having a passageway for downward passage of a leg means therethrough; said base slidably encompassing said leg means;
      ii. a structurally strong member having a plurality of stations at a plurality of respective predetermined heights for preventing movement of a lifting means upwardly along said member past a respective station when a top fastening means is emplaced at the respective station;
   b. a lifting means for lifting said superstructure and any attached object; said lifting means being movable longitudinally of said member of said superstructure;
   c. top fastening means for fastening said lifting means so as to prevent movement upwardly past a predetermined station on said superstructure;
   d. connecting means for connecting said superstructure with said object; said connecting means being connected to said superstructure and having means for removably connecting with said object;
   e. extensible leg means for extending downwardly from said superstructure; said leg means being slidably disposed in said passageway through said base; said leg means having a plurality of stations at a plurality of respective heights along said leg means; each said station along said leg means including a second aperture penetrating through said leg means; said leg means having a force pad means for receiving a jacking force;

f. bottom fastening means for fastening said base so as to prevent movement of said base downwardly along said leg means past a predetermined station at which said bottom fastening means is placed; said bottom fastening means comprising a pin means for pinning through said second aperture at a selected station; said bottom fastening means extending past said leg means so as to prevent downward movement of said base past the selective station; said top and bottom fastening means being alternately operable to a plurality of different stations for jacking up said object to said height;

g. jacking means for effecting raising of said object; said jacking means being adapted to be positioned between said force pad means of said leg means and said lifting means for applying the jacking force to force said lifting means and said force pad means apart longitudinally of said superstructure;

whereby said object can be raised by extension of said leg means through at least one cycle of fixing said lifting means and jacking downwardly on said leg means and fastening said superstructure along said leg means.

8. The jacking of claim 1 wherein said jack means includes a hydraulic ram for forcing said force pad and said lifting means apart.

9. The jack of claim 1 wherein said superstructure and said legs means are greater than two feet in length, said substantially any height can be achieved through repeated cycles of affixing said lifting means at a station along said superstructure, extending said leg means, and affixing said base along said leg means, repositioning and reaffixing said lifting means, and repeating said cycle.

10. The jack of claim 1 wherein said leg means had disposed at its bottom end a foot means for spreading the area bearing the load of said object; said foot means and said base being adapted and fitted such that said base can be attached to said object with said foot at ground level.

11. The jack of claim 1 wherein said jack is adapted to be broken down into three major subassemblies; each said subassembly being able to be handled by a single workman to facilitate use of the jack; the subassemblies comprising a superstructure assembly that includes the lifting means, connecting means, and top fastening means; a leg assembly that includes the bottom fastening means; and a jacking means.

* * * * *